United States Patent
McGrath et al.

(10) Patent No.: US 6,799,180 B1
(45) Date of Patent: Sep. 28, 2004

(54) METHOD OF PROCESSING SIGNALS AND APPARATUS FOR SIGNAL PROCESSING

(75) Inventors: John Mark McGrath, Bracknell (GB); Andrew Collins, Basingstoke (GB); Rex Martin Dorricott, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 218 days.

(21) Appl. No.: 09/656,972

(22) Filed: Sep. 7, 2000

(30) Foreign Application Priority Data

Sep. 8, 1999 (GB) ............................................. 9921235

(51) Int. Cl.$^7$ .............................................. G06F 17/30
(52) U.S. Cl. ...................................... 707/100; 707/200
(58) Field of Search ............................. 707/1, 3, 104.1, 707/100, 10, 5, 200; 709/231, 203; 345/716, 719; 386/96

(56) References Cited

U.S. PATENT DOCUMENTS

| | | | |
|---|---|---|---|
| 5,493,677 A | | 2/1996 | Balogh et al. ............... 707/600 |
| 5,835,667 A | * | 11/1998 | Wactlar et al. ................ 386/96 |
| 6,282,549 B1 | * | 8/2001 | Hoffert et al. ................. 707/3 |
| 6,366,296 B1 | * | 4/2002 | Boreczky et al. .............. 707/1 |
| 6,374,260 B1 | * | 4/2002 | Hoffert et al. ................. 707/3 |
| 6,377,995 B2 | * | 4/2002 | Agraharam et al. ........ 709/203 |

FOREIGN PATENT DOCUMENTS

| | | |
|---|---|---|
| GB | 2 196 463 | 4/1988 |
| GB | 2 252 442 | 8/1992 |
| GB | 2 294 355 | 4/1996 |
| GB | 2 305 525 | 4/1997 |
| GB | 2 327 526 | 1/1999 |
| WO | WO 96 12239 | 4/1996 |

* cited by examiner

*Primary Examiner*—Diane D. Mizrahi
(74) *Attorney, Agent, or Firm*—Frommer Lawrence & Haug LLP; William S. Frommer; Hans R. Mahr

(57) ABSTRACT

The present invention provides a system and method for navigating through source content to identify a desired feature within the source content, semantic source metadata being associated with portions of the source content. The system includes an input interface for receiving a request for the desired feature, and a processing unit for generating from the request a search request specifying the desired feature with reference to semantic metadata, and for causing the search request to be processed to identify semantic source metadata indicative of the desired feature. An output interface is provided for outputting as the desired feature a representation of the portion of the source content associated with the identified semantic source metadata. This provides an accurate and efficient technique for finding particular features within the source content.

14 Claims, 3 Drawing Sheets

METHOD OF PROCESSING SIGNALS AND APPARATUS FOR SIGNAL PROCESSING

BACKGROUND OF THE INVENTION

1. Field of the Invention

The present invention relates to a system and method for navigating through source content. The source content preferably takes the form or video and/or audio material.

2. Description of the Prior Art

The reviewing of source content, for example for editing or archival purposes, is traditionally a labour intensive task. Typically, the source content will be loaded into a device for reproducing the source content, for example a video recorder or a disk player and a user will then interact with that device via an editing or archival system, which would typically be a computer-based system.

Prior to editing the source content, or preparing the source content for archival, the user typically has to spend a significant amount of time reviewing the source content to familiarise himself/herself with the material to be edited or archived (including learning what material there is, and where that material is located within the source content), and the time spent performing this initial familiarisation with source content clearly impacts on the efficiency of the editing or archival process. During this initial familiarisation step, and indeed during subsequent steps, the user may wish to move around between particular parts of the source content, and it has been found that significant time is spent in accurately and efficiently finding particular features within the source content.

SUMMARY OF THE INVENTION

Viewed from a first aspect, the present invention provides a system for navigating through source content to identify a desired feature within the source content, semantic source metadata being associated with portions of the source content, the system comprising: an input interface for receiving a request for the desired feature; a processing unit for generating from the request a search request specifying the desired feature with reference to semantic metadata, and for causing the search request to be processed to identify semantic source metadata indicative of the desired feature; and an output interface for outputting as the desired feature a representation of the portion of the source content associated with the identified semantic source metadata.

There is currently much interest in the generation of metadata, metadata being data which describes content. Indeed many standards are being developed for metadata, for example by SMPTE-EBU (Society of Motion Picture and Television Engineers-European Broadcast Union) and by MPEG-7 (Motion Pictures Expert Group which is an ISO/TEC standards body SG29/WG11).

A certain amount of metadata can be added automatically at source, for example good shot markers, Rec marks (indicating where recording starts/stops), GPS location, Time and Date, UMID (Unique Material Identifier), Camera settings, focus, zoom, etc. Further metadata can be manually associated with the source content after it has been created, for example Cameraman, Journalist Notes, Style comments, Suggestions, Annotations, Location/Assignment comments, Shot identification such as Intro, Finish Commentary, Voice Over, etc. In addition, there is much development in progress directed to the automatic extraction of metadata from the content, for example by using recognition tools, for example face and feature detection tools, speech recognition tools, etc., to identify features within the content, and thereby enable appropriate metadata to be added.

It will be appreciated that at least some of the above-mentioned examples of metadata provide contextual/descriptive information about the actual content of the source content, such metadata being referred to herein as "semantic metadata". Examples of semantic metadata would be shot identification information, good shot markers, an "interview question" identifier to identify the start of interview questions, and any metadata used to identify face shots, speech, etc.

The present invention takes advantage of the current proliferation in semantic metadata associated with source content (hereafter referred to as semantic source metadata) to enable more efficient and accurate navigation through source content to locate features of interest to the user.

More particularly, in accordance with the present invention, the system is arranged to receive a request for a desired feature within the source content. The desired feature may be couched in absolute terms, for example the request may be for the start of speech, for the portion of the source content marked as an introduction, etc. Alternatively, the request for the desired feature may be couched in relative terms, for example a request for the next face, next transition, etc.

The processing unit in accordance with the present invention is arranged to generate from the request a search request specifying the desired feature with reference to semantic metadata. Hence, the search request will typically identify one or more items of semantic metadata which might be used to locate the desired feature requested. For example, if the request was for a particular interview question such as "interview question 2", appropriate semantic metadata would be interview question flags used to identity the beginning of particular interview questions within the source content. Similarly, if the request is for the next face, then appropriate semantic metadata would be metadata identifying a portion of the source content as containing a face.

Once the search request has been generated, the processing unit is arranged to cause the search request to be processed to identify semantic source metadata within the source content indicative of the desired feature. This will typically involve a search through the semantic source metadata to identify semantic source metadata matching that specified in the search request. Once the search request has been processed, the system of the present invention is arranged to output as the desired feature a representation of the portion of the source content associated with the semantic source metadata identified during processing of the search request.

The semantic source metadata may be stored on a variety of different storage media, and may be stored with, or separately to, the source content. In a first embodiment of the present invention, the semantic source metadata is stored in a randomly-accessible storage medium, and the processing unit is arranged to cause the search request to be applied to the semantic source metadata as stored in the randomly-accessible storage medium. By storing the semantic source metadata in a randomly-accessible storage medium, it is possible to search through the semantic source metadata in a non-linear fashion, which assists in increasing the speed of the search process.

In preferred embodiments, the source content comprises video material, and at least some of the semantic source metadata identity video features within the source content.

In such embodiments, an iconic representation of the video features may be stored with the associated semantic source metadata, in which event the representation output by the output interface can be arranged to comprise the iconic representation associated with the semantic source metadata identified during processing of the search request. By this approach, an indication of the portion of the source content identified as a result of the request for the desired feature can be output to a user without having to scan through the source content to retrieve that portion of source content. This can significantly increase the speed of the navigation process, particularly when the source content is stored in a linear format, for example on a digital tape.

Further, in preferred embodiments, the source content comprises audio material, and at least some of the semantic source metadata identify audio features within the source content. As with video material, an iconic representation of the audio features may be stored with the associated semantic source metadata and the representation output by the output interface as a result of the processing of the search request may comprise the iconic representation associated with the identified semantic source metadata. As an example, an iconic representation of the audio may be provided by a wave form picture, which to the trained eye provides some information about the content of the audio material.

As mentioned earlier, the semantic source metadata may be stored with the source content. However, in a first embodiment, the semantic source metadata is stored separately to the source content, and is associated with the source content via time codes.

In an alternative embodiment, the semantic source metadata is stored with the source content on a storage medium, and when the processing unit causes the search request to be processed to identify semantic source metadata indicative of the desired feature, the output interface is arranged to output the associated portion of the source content as the desired feature. In this embodiment, when applying the search request to the semantic source metadata, the system will automatically scan through both the semantic source metadata and the associated source content, and accordingly will readily be able to output the associated portion of the source content to indicate the result of the search request.

In preferred embodiments, the source content to be navigated through already contains appropriate semantic source metadata to facilitate effective navigation. However, it is also possible that the system may be connected to appropriate recognition tools to enable generation of relevant semantic source metadata "on the fly". Accordingly, in one embodiment, dependent on the search request, the processing unit is arranged to access a predetermined recognition tool to cause the recognition tool to review the source content and to generate semantic source metadata required to process the search request. Accordingly, as an example, if the request received was for the next face, a face recognition tool may be activated to scan through the source content from the current location to generate semantic source metadata for the location in the source content where the next face appears. Here, it is apparent that the result of the search is identified at the same time as the semantic source metadata is generated.

In a first preferred embodiment, the input interface is connectable to a drawing tool, and the request for the desired feature is entered by a user via the drawing tool. It will be appreciated that the desired features could be identified by defining appropriate gestures to be entered via the drawing tool. In an alternative embodiment, the input interface is connectable to a jog-shuttle device, and the request for the desired feature is entered by a user via the jog-shuttle device. For example, individual buttons on the jog-shuttle device may be used to identify features such as face, transition, speech, and then the jog-shuttle element can be used to specify relative information, such as "next" or "previous".

In preferred embodiments, the system for navigating through source content is embodied in an editing system. However, it will be appreciated that the system could also be used in other environments, for example archiving systems.

Viewed from a second aspect, the present invention provides a method of operating a system to navigate through source content to identify a desired feature within the source content, semantic source metadata being associated with portions of the source content, the method comprising the steps of: (a) receiving a request for the desired feature; (b) generating from the request a search request specifying the desired feature with reference to semantic metadata; (c) processing the search request to identify semantic source metadata indicative of the desired feature: and (d) outputting as the desired feature a representation of the portion of the source content associated with the identified semantic source metadata.

Viewed from a third aspect, the present invention provides a computer program for operating a system to navigate through source content to identify a desired feature within the source content, semantic source metadata being associated with portions of the source content, the computer program being configured in operation to cause the system to perform the steps of: (a) generating from a request for the desired feature a search request specifying the desired feature with reference to semantic metadata; (b) causing the search request to be processed to identify semantic source metadata indicative of the desired feature; and (c) retrieving a representation of the portion of the source content associated with the identified semantic source metadata to be output as the desired feature.

BRIEF DESCRIPTION OF THE DRAWINGS

The present invention will be described further, by way of example only, with reference to a preferred embodiment thereof as illustrated in the accompanying drawings, in which.

DESCRIPTION OF A PREFERRED EMBODIMENT

For the purpose of explaining the preferred embodiment of the present invention an editing system will be considered.

Figure 1:
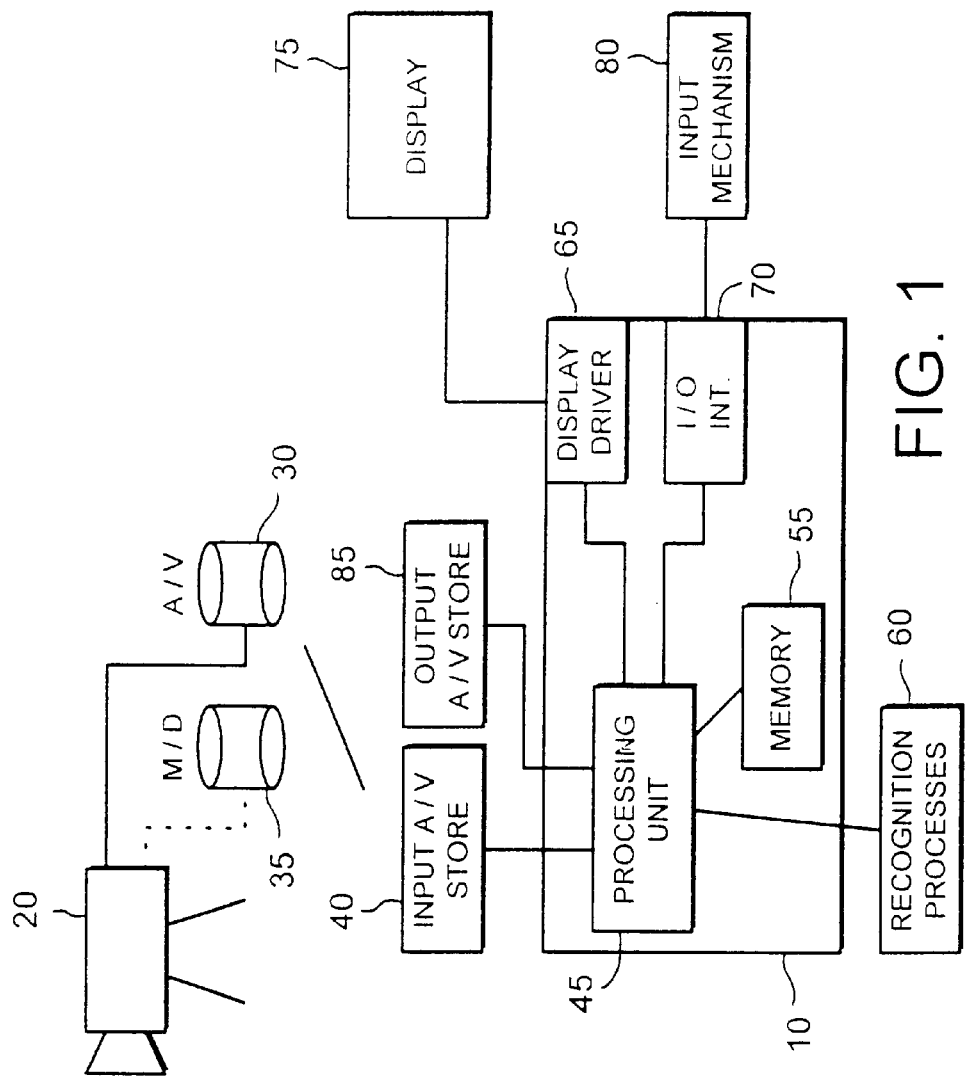
FIG. 1 is a block diagram illustrating an editing system in accordance with a preferred embodiment of the present invention.

FIG. 1 is a block diagram illustrating an editing system 10 in accordance with a preferred embodiment of the present invention. The editing system 10 includes a processing unit 45, for example a microprocessor, for receiving source content and applying editing operations to the source content in order to produce an edited content sequence. Internal memory 55, for example read only memory (ROM), random access memory (RAM), etc., is provided to store software executed by the processing unit 45 along with data used by the processing unit 45.

A display driver 65 is provided to enable display signals to be output from the editing system 10 to a connected display device 75. Further, an input/output interface 70 is provided to enable an input mechanism 80, for example a keyboard, mouse, jog-shuttle dial, a drawing tool such as a pen and tablet, etc., to be connected to the editing system 10. Via the display device 75 and the input mechanism 30, a user of the editing system 10 is able to interact with the editing process performed by the editing system 10.

For the purpose of the preferred embodiment of the present invention, it will be assumed that the source content edited by the editing system 10 is audio/video (A/V) material, such as may be obtained via a digital camera 20. Although A/V material may also be produced in analogue form, in preferred embodiments of the present invention the editing system operates on digital data, and hence any analogue A/V material would be converted into digital form prior to inputting to the editing system 10.

When A/V material is produced by the digital camera 20, it is stored on a suitable medium 30, for example a digital tape, or a digital disk. Digital technology is now at a stage where certain metadata can be associated with the A/V material at the time that A/V material is first generated, and in preferred embodiments such metadata will be stored on a suitable medium 35, which again may be a digital tape or disk. It should be noted that the metadata may, but need not, be located on the same physical storage medium as the A/V material to which it relates.

At some point prior to the A/V material being passed to the editing system 10, additional metadata may be added if desired, for example via the manual addition of metadata.

There are many types of metadata which may be associated with source content, Table 1 below providing some examples of types of metadata:

TABLE 1

| | |
|---|---|
| Business information: Cameraman. Journalist. Assignment number, Copyright. | Transition marking: Automated identification and categorisation of cut, dissolve, fade. |
| Equipment specification: Camera Serial Number. Lens Parameters, Technical Features. | Shot Composition marking: Zoom and wide angle marking. |
| Material identification: Unique Material Identifiers (UMID) | Noise marking: High background noise (probably high power low frequency noise) or low noise (i.e. silence portions). |
| Location markers: GPS, Timezone, Fixed location (e.g. Speaker's microphone in UK Parliament, or Goal end camera) | Tempo/Beat marking: Rhythm. period sound events. |
| User defined marking: Good shot markers, production comments. | Colour/Contrast change: Could be caused by camera flash, lighting effects. |
| External motion: Global camera motion through zoom or panning. Internal motion: Object trajectory, such as in sports, or human motion (i.e. a cohesive object such as a person with a "relatively" slowly changing motion) | Pitch/Volume modulation: This is the case for long term audio events such as music or speech dialogues. Audio Pattern/Discontinuity: Such as rhythm, tempo, pace. |

When the A/V material is to be edited, it is stored in an input A/V store 40, for example a digital tape or disk player, or a server, along with any associated metadata (hereafter referred to as source metadata).

In accordance with the preferred embodiment of the present invention, a user is able to navigate through the source A/V material using appropriate commands entered via the input mechanism 80. Accordingly a user is able to input a command specifying a request for a particular desired feature. This may for example be a request for the start of speech within the A/V material, a request for the portion of the source A/V material marked as being an introductory portion, a request for the next face, next transition, etc. It will be appreciated that there are a number of ways in which these commands may be entered. For example, a user may use a keyboard and/or a mouse to navigate through a number of menus displayed on the display device 75 in order to select a command specifying the appropriate desired feature sought. Alternatively, the input mechanism 80 may take the form of a drawing tool, and the editing system 10 may include recognition routines to recognise predefined gestures entered via the drawing tool as commands for particular desired features. As another alternative, the input mechanism 80 may consist of a jog-shuttle device, with individual buttons on the job-shuttle device being programmed to indicate desired features such as face transition speech. In this instance, the jog-shuttle element can then be used to specify relative information, such as "next" or "previous".

The request for a desired feature as input via the input mechanism 80 is passed from the I/O interface 70 to the processing unit 45. Here, the processing unit generates from the request a search request specifying the desired feature with reference to semantic metadata. In preferred embodiments, the processing unit may reference data stored in the memory 55, or in an external storage medium such as a database, which for each of a predetermined number of desired features, will identify one or more items of semantic metadata which might be used to locate that desired feature. Accordingly, in this embodiment, the user will be able to navigate based on any of a predetermined number of desired features, such as next face, next transition, etc, and the processing unit 45 will be able to retrieve from storage appropriate semantic metadata to be used to search for that desired feature.

Once the search request has been generated, it is applied to the semantic source metadata associated with the source A/V material in order to identify semantic source metadata indicative of the desired feature. If the original request was couched in relative terms, for example a request for the next face, next transition, etc. then clearly the search will need to begin from the current location within the source A/V material. The input A/V store and/or the processing unit 45 will typically have a record of the current location within the source A/V material, and accordingly from that information will be able to determine the corresponding semantic source metadata from which to begin the search.

As mentioned earlier, the semantic source metadata may be recorded with the source A/V material, such that the search is performed directly on the storage medium containing the source A/V material. However, alternatively, the semantic source metadata may be stored on a physically separate storage medium to tile source A/V material, and the search may then be performed on the semantic source metadata without at the same time causing the input A/V store to traverse through the source A/V material.

Figure 2:
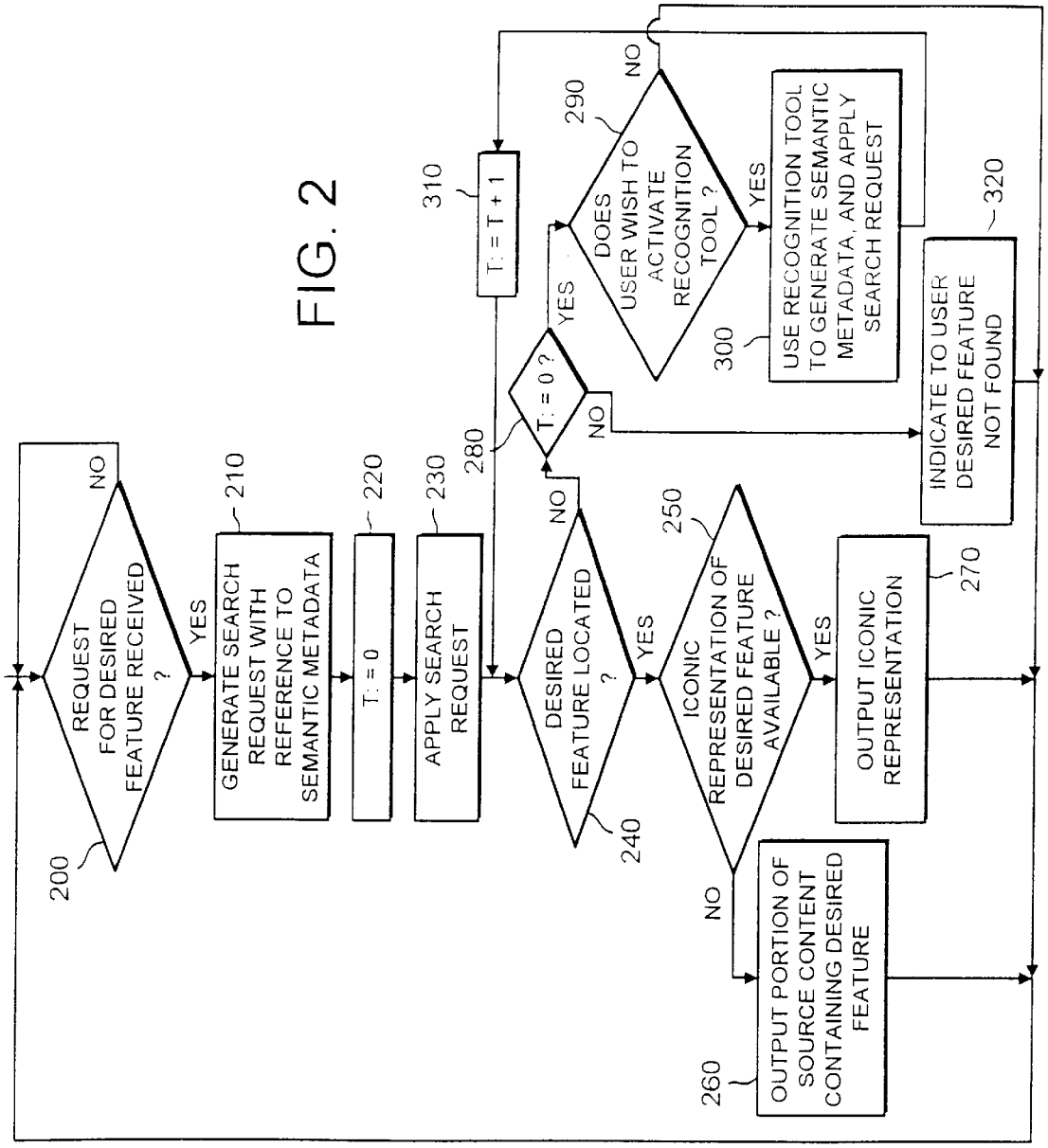
FIG. 2 is a flow diagram illustrating the operation of an editing system in accordance with a preferred embodiment of the present invention.

FIG. 2 illustrates the process used in preferred embodiments to navigate through source content, and as can be seen from FIG. 2 the above-described steps of receiving a request for a desired feature, generating a search request specifying the desired feature with reference to semantic metadata, and applying the search request, are illustrated by steps 200, 210 and 230, respectively, in FIG. 2. It should also be noted that, in preferred embodiments, at some stage prior to moving from step 230 to step 240, a parameter T is set equal to zero. In the example illustrated in FIG. 2, it is chosen to set this parameter equal to zero after the search request has been generated, and prior to application of the search request, but it will be appreciated that the setting of that parameter to zero can take place at any appropriate point prior to the process moving to step 240.

At step 240, it is determined whether the desired feature has been located as a result of applying the search request. This will be the case if the application of the search request has resulted in any semantic source metadata being found matching the semantic metadata specified in the search request. Accordingly, taking the example of a request for the next face, if starting at the current location, and scanning through the semantic source metadata from that point forward, a match of the semantic source metadata with the semantic metadata specified by the search request is found (for example because a next face identifier is located), then that semantic source metadata will be returned as the result of the search request, and will indicate that a desired feature has been located.

It will be appreciated that irrespective of whether the semantic source metadata is stored separately, or with, the source A/V material, there will be a direct correlation between a particular item of semantic source metadata and a particular portion of the source A/V material. If the semantic source metadata is stored with the source A/V material, it will be appreciated that this correspondence will be indicated by the location of the semantic source metadata within the source material. If the semantic source metadata is stored separately from the source material, then appropriate information will be stored with the semantic source metadata to identify which portion of the source material it relates to. For example, time codes may be associated with the semantic source metadata to indicate particular points within the source A/V material.

Assuming a desired feature is located at step 240, then the process proceeds to step 250 where it is determined whether an iconic representation of the desired feature is available. This will be the case in preferred embodiments where the semantic source metadata is stored separately from the source A/V material, for example in a randomly-accessible storage medium. In this instance, as mentioned earlier, it may be advantageous to store iconic representations of the desired feature with the semantic source metadata to avoid the need to sequence through the source A/V material in order to identify the portion of the source material associated with the semantic source metadata found as a result of applying the search request. For video features, the iconic representation will preferably provide an image indicative of that portion of the video material, whilst for audio features, the iconic representation may take the form of a waveform image indicative of the audio content.

If an iconic representation is available, then that iconic representation is retrieved and output to the display device 75 as the result of the user's request. The process then returns to step 200 to await a further request from the user. If the user decides, based on the iconic representation provided, to review the source material directly, then the input A/V store can be instructed to cue up that portion of the source material containing the desired feature, that portion then being output to the user.

If at step 250, an iconic representation is not available, then the process proceeds to step 60, where the source A/V material is scanned to find the portion of the source content associated with the semantic source metadata identified as a result of the search, and that portion of the source content is output to the display device 7 as the desired feature. Again, the process then returns to step 200 to await a further request from the user.

If at step 240, a desired feature is not located, i.e. the application of the search request does not result in the identification of any semantic source metadata meeting the search criteria, then the process proceeds to step 280, where it is determined whether the parameter T equals zero. If T does equal zero, then this indicates that the process is in a first iteration, and accordingly the process proceeds to step 290, where in preferred embodiments a user is prompted to indicate whether he wishes to activate a predetermined recognition tool.

In accordance with the preferred embodiment of the present invention, the editing system is able to be connected to a number of recognition processes 60, which might take the form of one or more plug-in recognition tools. These recognition tools can be used in the preferred embodiment to assist in the generation of semantic source metadata "on the fly" as the search request is applied. For example, a recognition tool for detecting faces might be used to scan the source A/V material looking for video containing faces. If the search request is seeking to identify the next face, then this recognition tool might be activated to search through the source A/V material from the current location looking for the next portion of video containing a face, and to return as semantic source metadata an indication of the location of the portion within the source A/V material containing the next face. In this instance, it will be apparent that the result of the search is identified at the same time as the semantic source metadata is generated.

Hence, assuming a user at step 290 does indicate that he wishes to activate an appropriate recognition tool, then the process proceeds to step 300 where the recognition tool is used to search through the source A/V material and to generate semantic source metadata when it reaches a point where the desired feature is recognised. The output of the recognition tool in effect indicates the result of the search request. Hence, the recognition tool will either output a signal providing as semantic source metadata an indication of the location of a portion within the source A/V material matching the search criteria, or alternatively will indicate that the desired feature has not been recognised. The process then proceeds to step 310, where the parameter T is incremented by 1, and then the process returns to step 240 where it is determined whether the desired feature has been located.

If as a result of using the recognition tool a desired feature has been located, then the process proceeds through steps 250 to 270 as discussed previously. If the desired feature is still not located, then the process again proceeds to step 280, where at this point it is now determined that T no longer equals zero, and accordingly the process branches to step 320. At step 320, an indication is provided to the user that the desired feature has not been found. This indication may take a variety of forms, for example a text message may be displayed on the display device 75.

It will be appreciated that the flow diagram of FIG. 2 is only intended to provide an example of the way in which the search request might be processed, and it will be appreciated that the exact processing of the search request may be altered as desired. For example, the editing system 10 may be arranged to automatically activate a recognition tool in the event that the desired feature is not located, or the system may enable the loop specified by steps 280, 290, 300 and 310 to be executed more than once before determining that the desired feature has not been found.

Figure 3:
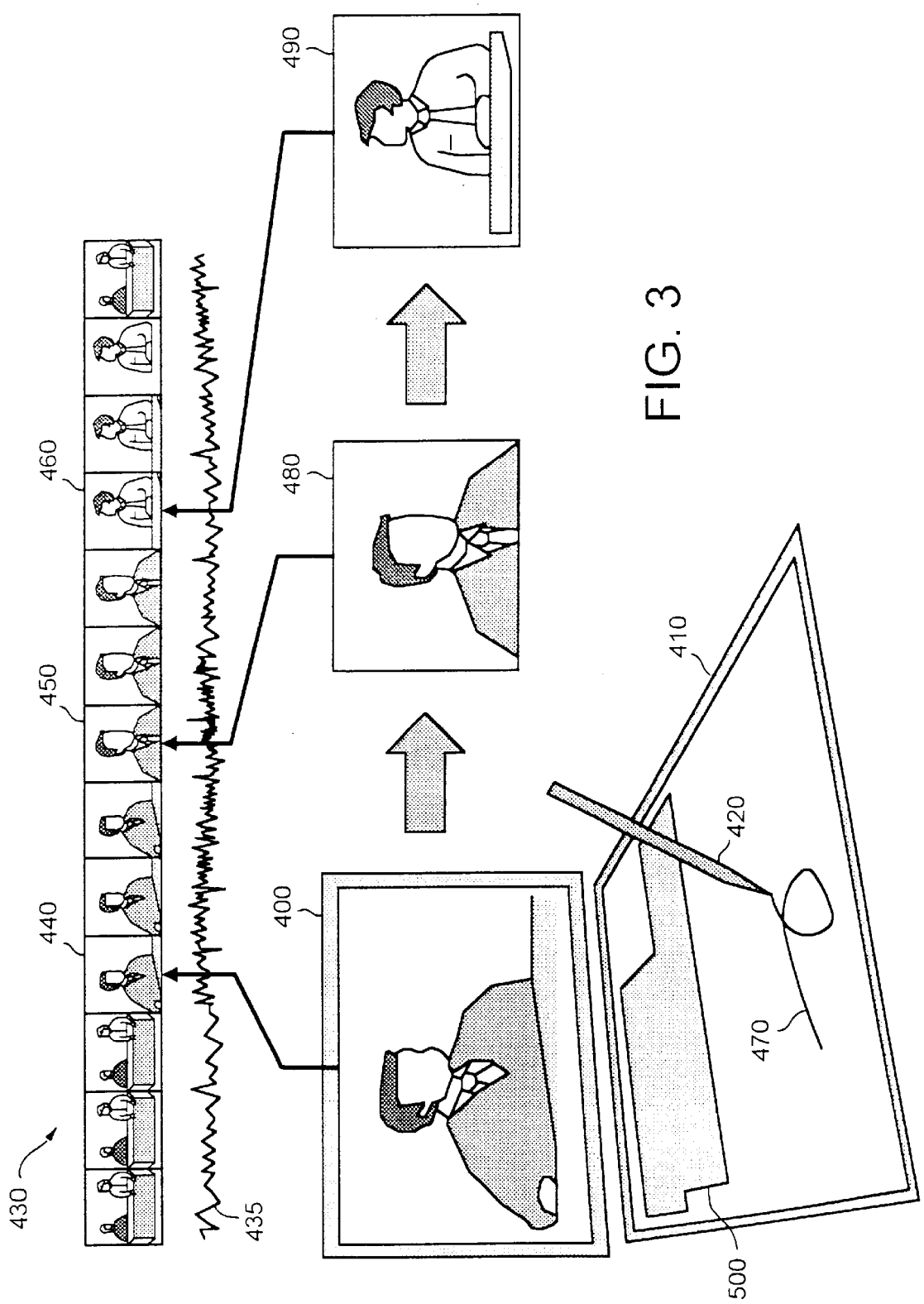
FIG. 3 is a diagram schematically illustrating how navigation through source A/V material may be implemented in accordance with the preferred embodiment of the present invention.

FIG. 3 provides a schematic illustration of the way in which the navigation technique of preferred embodiments may be used. The sequence 430 illustrates a number of frames of source A/V material relating to a recorded interview. The audio representation 435 is provided to indicate that audio is present within the A/V material.

At a certain point in time, the user of the editing system has displayed before him on display device 400 a representation of the portion 440 of the A/V material. The user then uses an input mechanism such as a pen 420 and tablet 410 drawing tool to enter a request for a desired feature, in this instance the next face in the A/V sequence. As illustrated schematically in FIG. 3, this request may be entered by any appropriate gesture 470 drawn with the pen 420 on the tablet 410. The rectangular blocks 500 schematically illustrate a timeline display that may be provided on a typical non-linear editing system, and are not relevant to the present discussion.

Assuming this source A/V material has associated therewith appropriate semantic source metadata to identify the next face, then a search request is generated and applied to the semantic source metadata of the source A/V material, resulting in semantic source metadata associated with portion 450 being identified. It should be noted that in preferred embodiments semantic source metadata identifying a next face will not necessarily identify the next different person in the A/V sequence, but may instead identify each different face shot, whether that be a different shot of the same person, or a shot of a different person. Here, the next face has identified the next shot of the same persons in this example the next shot representing a closer face shot of the same person.

Accordingly, as a result of the application of the search request, the user is presented with the image 480 on the display device 400 representing the desired feature within the A/V sequence. If the user were to repeat the command to find the next face, then as illustrated in FIG. 3, a search request would be generated and applied to the source A/V material, resulting in semantic source metadata associated with portion 460 being identified. Accordingly, the user would be presented with a representation 490 of that portion 460 on the display device 400.

Although a particular embodiment of the invention has been described herewith, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A system for navigating through source content to identify a desired feature within the source content, the system comprising:

a semantic source metadata generator operable to generate semantic source metadata and to associate the semantic source metadata with the source content when the source content is first generated, the semantic source metadata being associated with portions of the source content; and an editing system including an input interface for receiving a request for the desired feature, a processing unit for generating from the request a search request specifying the desired feature with reference to semantic metadata, and for causing the search request to be processed to identify semantic source metadata indicative of the desired feature, and an output interface for outputting as the desired feature a representation of the portion of the source content associated with the identified semantic source metadata;

wherein the semantic source metadata is stored in a randomly-accessible storage medium, and the processing unit is arranged to cause the search request to be applied to the semantic source metadata as stored in the randomly-accessible storage medium.

2. A system as claimed in claim 1, wherein the source content comprises video material, and at least some of the semantic source metadata identify video features within the source content.

3. A system as claimed in claim 2, wherein an iconic representation of the video features is stored with the associated semantic source metadata, and the representation output by the output interface comprises the iconic representation associated with the identified semantic source metadata.

4. A system as claimed in claim 1, wherein the source content comprises audio material, and at least some of the semantic source metadata identify audio features within the source content.

5. A system as claimed in claim 4, wherein an iconic representation of the audio features is stored with the associated semantic source metadata, and the representation output by the output interface comprises the iconic representation associated with the identified semantic source metadata.

6. A system as claimed in claim 1, wherein the semantic source metadata is stored separately to the source content and is associated with the source content via time codes.

7. A system as claimed in claim 1, wherein the semantic source metadata is stored with the source content on a storage medium, and when the processing unit causes the search request to be processed to identify semantic source metadata indicative of the desired feature, the output interface is arranged to output the associated portion of the source content as the desired feature.

8. A system as claimed in claim 1, wherein, dependent on the search request, the processing unit is arranged to access a predetermined recognition tool to cause the recognition tool to review the source content and to generate semantic source metadata required to process the search request.

9. A system as claimed in claim 1, wherein the input interface is connectable to a drawing tool, and the request for the desired feature is entered by a user via the drawing tool.

10. A system as claimed in claim 1, wherein the input interface is connectable to a jog-shuttle device, and the request for the desired feature is entered by a user via the jog-shuttle device.

11. An editing system for editing source content, comprising a system for navigating through source content as claimed in claim 1.

12. A method of operating a system to navigate through source content to identify a desired feature within the source content, the method comprising the steps of:

(a) generating the source content;

(b) associating semantic source metadata with the source content, when the source content is first generated, the semantic source metadata being associated with portions of the source content;

(c) receiving a request for the desired feature;

(d) generating from the request a search request specifying the desired feature with reference to semantic metadata;

(e) processing the search request to identify semantic source metadata indicative of the desired feature; and (f) outputting as the desired feature a representation of the portion of the source content associated with the identified semantic source metadata;

wherein the semantic source metadata is stored in a randomly-accessible storage medium, and the processing unit is arranged to cause the search request to be applied to the semantic source metadata as stored in the randomly-accessible storage medium.

13. The system as claimed in claim 8, wherein the processing unit is arranged to access the recognition tool after attempting to identify existing semantic source metadata indicative of the desired feature.

14. The system as claimed in claim 1, wherein the processing unit is arranged to access one of a plurality of predetermined recognition tools to cause the accessed recognition tool to review the source content and to generate semantic source metadata required to process the search request, where each recognition tool is for generating a respective type of semantic source metadata and the accessed recognition tool is for generating a type of semantic source metadata that matches the search request.

\* \* \* \* \*